United States Patent
Kriesel et al.

(10) Patent No.: US 11,051,676 B1
(45) Date of Patent: Jul. 6, 2021

(54) DECONTAMINATING FLOOR MATS

(71) Applicants: Matthew Wayne Kriesel, Melrose, WI (US); Troy Bradley Goodenough, Mindoro, WI (US)

(72) Inventors: Matthew Wayne Kriesel, Melrose, WI (US); Troy Bradley Goodenough, Mindoro, WI (US)

(73) Assignee: Tak Logic, LLC, Ettrick, WI (US)

( * ) Notice: Subject to any disclaimer, the term of this patent is extended or adjusted under 35 U.S.C. 154(b) by 161 days.

(21) Appl. No.: 16/401,672

(22) Filed: May 2, 2019

Related U.S. Application Data

(63) Continuation-in-part of application No. 15/731,815, filed on Aug. 7, 2017, which is a continuation-in-part of application No. 14/999,722, filed on Jun. 20, 2016, now Pat. No. 10,807,767.

(60) Provisional application No. 62/231,004, filed on Jun. 22, 2015.

(51) Int. Cl.
*A47L 23/26* (2006.01)
*C09J 7/22* (2018.01)
*C09J 11/06* (2006.01)
*C09J 7/38* (2018.01)

(52) U.S. Cl.
CPC .............. *A47L 23/266* (2013.01); *C09J 7/22* (2018.01); *C09J 7/38* (2018.01); *C09J 11/06* (2013.01)

(58) Field of Classification Search
CPC .. A47L 23/266; C09J 7/38; C09J 11/06; C09J 7/22
See application file for complete search history.

(56) References Cited

U.S. PATENT DOCUMENTS

| | | | |
|---|---|---|---|
| 3,507,071 A | 4/1970 | Bryson | |
| 5,677,413 A | 10/1997 | Barksby et al. | |
| 5,864,001 A | 1/1999 | Masse et al. | |
| 6,588,511 B1 | 7/2003 | Kriesel et al. | |
| 6,673,409 B1 | 1/2004 | Wheatley | |
| 6,896,065 B2 | 5/2005 | Kriesel et al. | |
| 7,041,719 B2* | 5/2006 | Kriesel | A01L 7/02 524/114 |
| 7,125,602 B2 | 10/2006 | Wheatley | |
| 7,252,867 B2 | 8/2007 | Wheatley | |
| 7,910,188 B2 | 3/2011 | Wheatley | |
| 7,923,088 B2 | 4/2011 | Wheatley | |
| 8,110,269 B2 | 2/2012 | Wheatley | |
| 8,110,270 B2 | 2/2012 | Wheatley | |
| 8,302,213 B2 | 11/2012 | Kriesel | |
| 9,974,342 B1* | 5/2018 | Kriesel | A41D 13/0512 |
| D880,950 S | 4/2020 | Kriesel et al. | |
| 10,681,830 B1 | 6/2020 | Goodenough | |
| 10,717,582 B1 | 7/2020 | Goodenough | |
| 10,807,767 B1* | 10/2020 | Kriesel | C08G 59/1472 |
| D902,584 S | 11/2020 | Kriesel et al. | |
| 10,914,087 B1 | 2/2021 | Kriesel et al. | |
| 2004/0191446 A1 | 9/2004 | Kriesel | |
| 2004/0200623 A1 | 10/2004 | Kriesel | |
| 2006/0272367 A1 | 12/2006 | Kriesel | |
| 2006/0287147 A1 | 12/2006 | Kriesel | |
| 2008/0005929 A1 | 1/2008 | Hardy et al. | |
| 2008/0026658 A1 | 1/2008 | Kriesel | |
| 2008/0250729 A1 | 10/2008 | Kriesel | |
| 2009/0042676 A1 | 2/2009 | Kriesel | |
| 2010/0170139 A1 | 7/2010 | Zhou | |
| 2012/0222457 A1 | 9/2012 | Kriesel et al. | |
| 2015/0053583 A1 | 2/2015 | McCormick et al. | |

* cited by examiner

Primary Examiner — Rabon A Sergent
(74) Attorney, Agent, or Firm — M. Paul Hendrickson; Bryan R. Rosiejka

(57) ABSTRACT

The present invention provides floor mats possessing antipathogenic, cohesive, viscoelastomeric and adhesive attributes for removing foot and/or sole borne contaminants. A thermoset reaction product derived from a reaction media of a carefully balanced ratio of isocyanate prepolymer, polyether diols and triols, and organic plasticizers effectively provides a floor mat overlay for adhesively retaining and preventing the spreading of foot or sole borne pathogens and other contaminants.

29 Claims, 3 Drawing Sheets

DECONTAMINATING FLOOR MATS

CROSS-REFERENCE TO RELATED APPLICATION

This application is a Continuation-in-Part of U.S. Nonprovisional application Ser. No. 15/731,815 filed Aug. 7, 2017 which is a Continuation-in-Part of U.S. Nonprovisional application Ser. No. 14/999,722 filed Jun. 20, 2016 which is a Nonprovisional application of U.S. Provisional application No. 62/231,004 filed Jun. 22, 2015, all of which applications are incorporated in their entirety herein.

FIELD OF INVENTION

The present invention relates to mats, and more particularly to hygienic floor mats.

BACKGROUND OF THE INVENTION

Floor mats are commonly used to remove or cleanse soles of people and/or animals (e.g., shoe, bare feet, etc.) of undesirable contaminants. Feet commonly pass through pathogenic infested areas which are then transported upon the soles of people and/or animals to infect other sites. The pathogens are often housed within sole carried debris (dirt, water, dust, etc.) which often tenaciously clings to bare feet and sole treads. The soles of shoes are also prone to accumulate dust, which under certain circumstances (e.g., electronic manufacturing, gym floors, etc.), can create unwanted hazards.

There exists a host of potentially new hygienic uses for antipathogenic, decontaminating and washable floor mats. Current usage of adhesive-type floor mats primarily centers on the removal of dust particles from shoe soles. For example, in the manufacture of electronic products, it is essential in certain electronic manufacture (e.g., circuit boards, transistors, microchips, etc.) that the manufacturing environment be completely free from dust particles. To achieve this objective, the electronic manufacturer will provide a dust free and clean premises, often equipped with dust removing or collecting devices and dust collecting floor mats. Dust collecting mats are also used in sports arenas to remove dust particles clinging to athletic shoe soles which can interfere with floor play and create hazardous play, such as for gymnasts. The current adhesively equipped floor mats are essentially limited to dust removal applications due to ineffectiveness when applied to other applications. Unfortunately, sole contaminating concerns are not limited to only dust removal, but also extend to the harboring of pathogens by all forms of foot soles (e.g., paws, feet, shoe soles, etc.) which are freely transported by an unhealthy foot sole trafficking. Notwithstanding, the current limited usage of an unheralded new hygienic vista of floor mat usage would arise if there existed hygienic floor mats which were more effective at removing foot carried pathogens and contaminants.

Within recent years, it has been common practice to install dust collecting floor mats containing a series of stacked adhesive floor mats typically composed of flexible plastic sheets equipped with an adhesive coating to serve in removing dust particles which may be clinging to soles. In typical use, a participant seeking to cleanse shoe soles from dust particles will step upon an adhesive mat before entering a dust free room or a playing area. Such dust collecting floor mats typically contain a series of stacked and peelable adhesive mats (e.g., 20-30 adhesive mats) which are sequentially peeled away and discarded upon reaching dust particle saturation. These dust particle decontaminating mats are relatively expensive (especially under heavy trafficking) and become readily unusable upon dust saturation. Consequently, frequent replacements necessitate expensive restocking of the spent floor mats.

Throughout the years, numerous attempts have been made to reduce sole or foot carried pathogenic contamination. Current bristled and rubberized floor mats merely brush aside contaminants without an effective elimination of the pathogenic source. Another approach has been to wrap the feet or shoes in plastic bags in order to prevent the spread of pathogens. Such an approach becomes impractical, especially in situations wherein immediate egress is necessary or trafficking is heavy.

A major potential decontamination floor mat usage would accordingly arise through the hygienic use of pathogenic decontaminating floor mats possessing a more effective decontaminating overlay. Potential new uses for such decontaminating floor mats would extend to almost any use wherein pathogenic contaminated soles are of concern. For example, it is common practice in many households to remove one's shoe at an entryway in order to prevent invasive pathogenic contamination of the premises. It is also known that pets are a source of pathogenic contamination. Other exemplary hygienic usage of decontaminating floor mats exists within the animal husbandry field wherein a sterile environment is essential to maintain a healthful flock or herd environment. Similarly, within the medical, dental and related hygienic fields, there exists a need for a hygienic pathogenic decontaminating floor mat, which would not only remove dust particles, but would also contribute highly effective antipathogenic, reusable, washable, releasable cohesiveness and adhesive attributes to the floor mat, all of which were heretofore uncommon to existing floor mats.

Accordingly, there exists a need for a more effective improved sole decontaminating floor mat which would overcome the defects and limited applicability of the currently available floor mats. The existing shoe sole cleansing mats are essentially devoid of any antipathogenic properties which can frustrate their hygienic utility. Great benefits would be derived if a sole decontaminating floor mat included an adhesive viscoelastomeric interface possessing unique hygienic and antipathogenic properties. A sole decontaminating floor mat possessing a preselected degree of effective adhesiveness coupled with a highly cohesive release from decontaminated soles would be of further advantage. Additional benefits would also arise if a floor mat saturated with contaminants could be decontaminated by conventional washing techniques and thereby be restored to its full usefulness without necessitating the current expensive discarding and restocking of replacements for the contaminated mats. The aforementioned unique benefits are realized by utilizing a unique hygienic, antipathogenic, cohesive, releasable, washable, and adhesive thermoset viscoelastomeric reaction product which imparts these highly effective characteristics when used as a decontaminating floor mat overlay.

SUMMARY OF THE INVENTION

Unique and highly effective decontaminating floor mats are provided herein through the use of a unique thermoset viscoelastomeric overlay possessing a combination of exceptional viscoelastomeric, antipathogenic, washable, reusable, cohesive, release and adhesive properties. The utility of these unique decontaminating floor mats is not only limited to dust collection applications, but also afford a host of unexpected benefits heretofore unfeasible with currently available floor mat systems. The thermoset viscoelastomeric overlay herein provides a unique floor mat system which effectively adhesively traps undesirable contaminants.

The decontaminating floor mats of this invention have an exceptional affinity to adhesively cling and entrap foot carried foreign debris and pathogens, coupled with an inherent capacity to cohesively release from the paws, hoofs, feet, and soles of people and/or animals subjected to its cleansing use. The unique adhesive and cohesive release attributes provided by the decontaminating floor mats herein effectuates a high degree of foot cleansing and release of a cleansed foot in a form substantially free from adhesive residue. The floor mats of this invention retain their effective decontaminating capacity until the maximum contamination or saturation level of the decontaminating floor mat is reached. Unlike conventional dust collecting floor mats, which must be discarded upon dust particle saturation, the present decontaminating floor mats may be restored to their original antipathogenic decontamination efficacy by conventional cleansing techniques, such as by washing (e.g., via hand-washing, conventional dishwasher washing, etc.) or by autoclave sterilization. Unlike conventional bristled floor mats, which simply brush aside deep seated sole contaminants, the viscoelastomeric attributes of the floor mat overlay herein penetrates into the deep-seated sole recesses and adhesively removes the contaminants therefrom. Dissimilar to conventional floor mats, the decontaminating floor mats of this invention also uniquely possess antipathogenic properties which inhibit microbial growth and render them particularly useful for a host of hygienic applications.

The unique decontaminating floor mats of this invention are provided by incorporating a unique cleansable, antipathogenic, cohesive and adhesive thermoset viscoelastomeric overlay into the construction of the floor mat so as to operationally interface onto the foot borne contaminants. Although the present invention broadly applies to any polymeric material possessing the aforementioned reusable, releasable, cohesive and adhesive viscoelastomeric properties, it is particularly applicable to a class of viscoelastomeric polymeric materials which also uniquely possess antipathogenic properties.

A particularly effective decontaminating viscoelastomeric floor mat overlay for forming the adhesive floor mat surface is a thermoset reaction product prepared from a thermosetting reaction media comprised of a substantially uniform admixture of an isocyanate prepolymer, from about 35 to about 55 percent by weight polyols with said polyols consisting essentially of a straight chain linking diol and a cross-linking triol, each having repetitive ether groups at a diol to triol weight ratio ranging from about 1:2 to about 2:1, and from about 20 to about 55 percent by weight of a plasticizer containing less than 50 percent by weight of an epoxidized triglyceride plasticizer and from about 0 to about 40 percent by weight of an ester plasticizer, with the total plasticizer being uniformly and cohesively dispersed and bound throughout the reaction product. Typically, the useful polyols will be comprised of liquid polyethers having a molecular weight in excess of about 1000 but less than about 10,000.

The viscoelastomeric thermoset reaction product overlay may be provided in a substantially solid decontaminating mat form or as a coating or inlay supported by a suitable floor mat support, such as a floor mat bed or by the floor itself.

In some aspects, the invention comprises an antipathogenic and viscoelastomeric floor mat equipped with an exposed surface region of a viscoelastomeric thermoset reaction product overlay adapted to adhesively remove contaminants from footed soles placed thereupon and cohesively release from the footed soles, said reaction product overlay being derived from a thermosetting reaction media comprised of a substantially uniform admixture of from about 4 to about 8 percent by weight isocyanate prepolymer, from about 35 to about 55 percent by weight polyols with said polyols consisting essentially of straight chain linking diols and cross-linking triols each characterized as having repetitive ether groups at a diol to triol weight ratio ranging from about 1:2 to about 2:1, and from about 20 to about 55 percent by weight of a plasticizer containing less than about 50 percent by weight of an epoxidized triglyceride plasticizer and from about 0 to about 40 percent by weight of an ester plasticizer with the plasticizer being uniformly and cohesively dispersed and bound throughout the reaction product overlay.

In some aspects, the reaction product overlay comprises a sheet of the reaction product overlay adapted for adhesive attachment to a supportive base. In other aspects, the reaction product overlay includes a protective cover to protect the reaction product overlay from becoming prematurely contaminated with contaminants before its use. In still other aspects, the reaction product overlay comprises a coating applied to a supportive base. In some further aspects, the supportive base comprises a plastic support.

In some aspects, the floor mat comprises a plurality of reaction product overlays disposed in a stacked configuration and further comprises a plurality of plastic sheet supports disposed therebetween wherein the plurality of plastic sheet supports each serve as a supportive base for each reaction product overlay.

In some aspects, the thermosetting reaction media contains from about 20 percent to about 48 percent by weight epoxidized soybean plasticizer. In other aspects, the isocyanate prepolymer consists essentially of a diisocyanate prepolymer and the reaction media contains from about 1 percent to about 20 percent by weight of a diester plasticizer at a weight ratio of epoxidized soybean oil plasticizer to diester plasticizer ranging from about 1:1 to about 6:1. In still other aspects, the isocyanate prepolymer comprises diisocyanate prepolymer in an amount from about 4 percent to about 7 percent by weight of the thermosetting reaction media. In yet other aspects, the diol comprises a member selected from a group of polyoxyethylene diols and polyoxypropylene diols having a molecular weight ranging from about 2,000 to about 6,000, and further comprises a member selected from a group of polyoxyethylene triols and polyoxypropylene triols having a molecular weight ranging from about 3,000 to about 7,000. In still other aspects, the weight ratio of diol to triol ranges from about 7:13 to about 13:7.

In some aspects, the reaction product overlay comprises a coating disposed upon a supportive base. In other aspects, the reaction product overlay comprises a sheet having a thickness of at least about 10 mils.

In some aspects, the floor mat includes bristled projections coated with the reaction product overlay. In other aspects, the reaction product overlay includes a removable protective cover to protect against premature contamination of the reaction product overlay. In still other aspects, the supportive base comprises a plastic sheet.

In some aspects, the reaction product overlay comprises an adhesive inlay adhesively engaged onto a supportive base. In other aspects, the floor mat consists essentially of the reaction product overlay adapted to be adhesively applied to a floor for use as the floor mat.

In some aspects, the dialkyl ester comprises dibutyl sebacate.

In some aspects, the invention comprises method for preparing a preformed antipathogenic, viscoelastomeric, cohesive and releasable adhesive thermoset floor mat reaction product overlay, said method comprising:

a. providing a thermosetting reaction media comprised of a substantially uniform admixture of about 4 to about 8 percent by weight isocyanate prepolymer, from about 35 to about 55 percent by weight polyols with said polyols consisting essentially of a straight chain linking diols and cross-linking triols each having repetitive ether groups at a diol to triol weight ratio ranging from about 3:1 to about 1:3, and from about 20 to about 55 percent by weight of a plasticizer comprising less than about 50 percent by weight of an epoxidized triglyceride plasticizer and from about 0 to about 40 percent by weight of an ester plasticizer;

b. preforming the thermosetting reaction media to a desired thermosetting form for preparing the reaction product overlay; and c. allowing the desired thermosetting form to thermoset so as to provide the reaction product overlay.

In further aspects, the providing of the thermosetting reaction media includes from about 5 to about 15 percent by weight of a liquid dialkyl ester plasticizer at a weight ratio of triglyceride plasticizer to dialkyl ester plasticizer ranging from about 1:1 to about 6:1. In other aspects, the thermosetting reaction media contains from about 10 to about 35 percent by weight polyether diol and from about 25 to about 35 percent by weight polyether triol, both of which have a molecular weight ranging from about 2,000 to about 7,000, at a diol to triol weight ratio of about 7:13 to about 13:7. In still other aspects, the reaction product overlay includes from about 4 to about 7 percent by weight of a diisocyanate prepolymer. In yet other aspects, the preforming comprises preforming the thermosetting reaction media into a thermosetting sheet form which upon curing provides the reaction product overlay in a sheeted form. In yet other aspects, a sheet of the reaction product overlay is adhesively applied to a floor to provide the floor mat.

In some aspects, the method further comprises contaminating the reaction product overlay with foot borne contaminants to form a contaminated reaction product overlay, and restoratively decontaminating the contaminated reaction product overlay by cleansing the contaminated reaction product overlay to operationally restore effectiveness of the reaction product overlay.

In some aspects, the preforming comprises coating a supportive base with the thermosetting reaction media.

In some aspects, the method further comprises placing a removable protective cover upon an exposed surface of the reaction product overlay to protect the surface against premature contamination.

In some further aspects, the dialkyl ester of the method comprises dibutyl sebacate.

DETAILED DESCRIPTION OF THE INVENTION

In its most basic form, a floor mat 1 of the present invention comprises at least one viscoelastomeric thermoset overlay 3. In other aspects, the floor mat 1 can additionally comprise a support structure 5 upon which the at least one viscoelastomeric thermoset overlay 3 can be disposed, though it need not be. In yet other aspects, the at least one viscoelastomeric thermoset overlay 3 can comprise a protective cover 3P disposed thereupon, It has been unexpectedly discovered that by equipping floor mats 1 with a unique viscoelastomeric thermoset reaction product overlay 3, the floor mats 1 will afford a host of uniquely beneficial floor mat uses. Unlike conventional adhesive surfaced floor mats which primarily serve as dust collectors, it has been found that a viscoelastomeric thermoset reaction product overlay 3 of this invention will create a unique hygienic and antipathogenic environment for floor mat use, while also providing a tenacious sole penetration and adhesiveness for effective removal of adverse contaminants from footed people and/or animal soles. The reaction product overlay 3 possesses exceptional cohesive release attributes, which upon adhesive disengagement, provides decontaminated soles essentially free of any adhesive residue. These unique attributes permit a tenacious adhesive retention of the foot-carried contaminants by the overlay 3 until overtly removed therefrom. The viscoelastomeric properties of the reaction product overlay 3 allows the reaction product overlay 3 to matingly image onto the impressing sole, and to remove contaminants from normally inaccessible regions of the sole.

Figure 4:
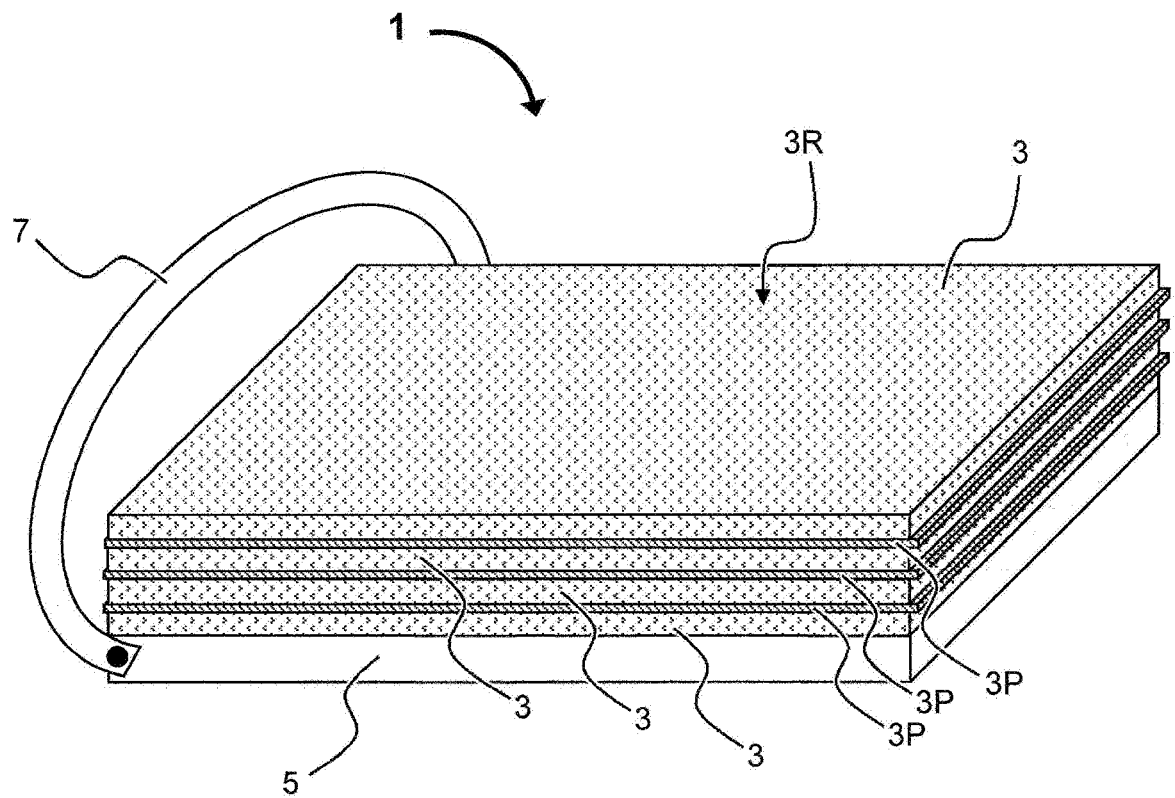
FIG. 4 depicts a perspective view of a portable decontaminating floor mat equipped with a carrying handle.
Figure 5:
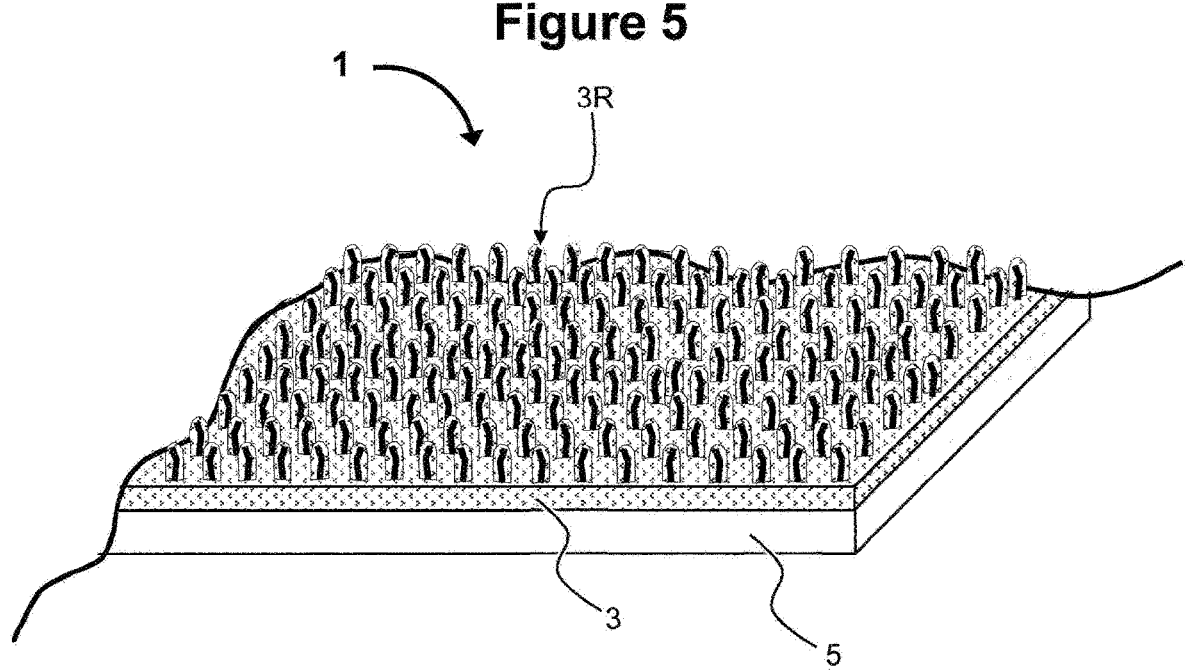
FIG. 5 is a partial perspective view of a bristled decontaminating floor mat wherein the floor mat bristles are coated with the antipathogenic viscoelastomeric thermoset overlay of this invention.
Figure 6:
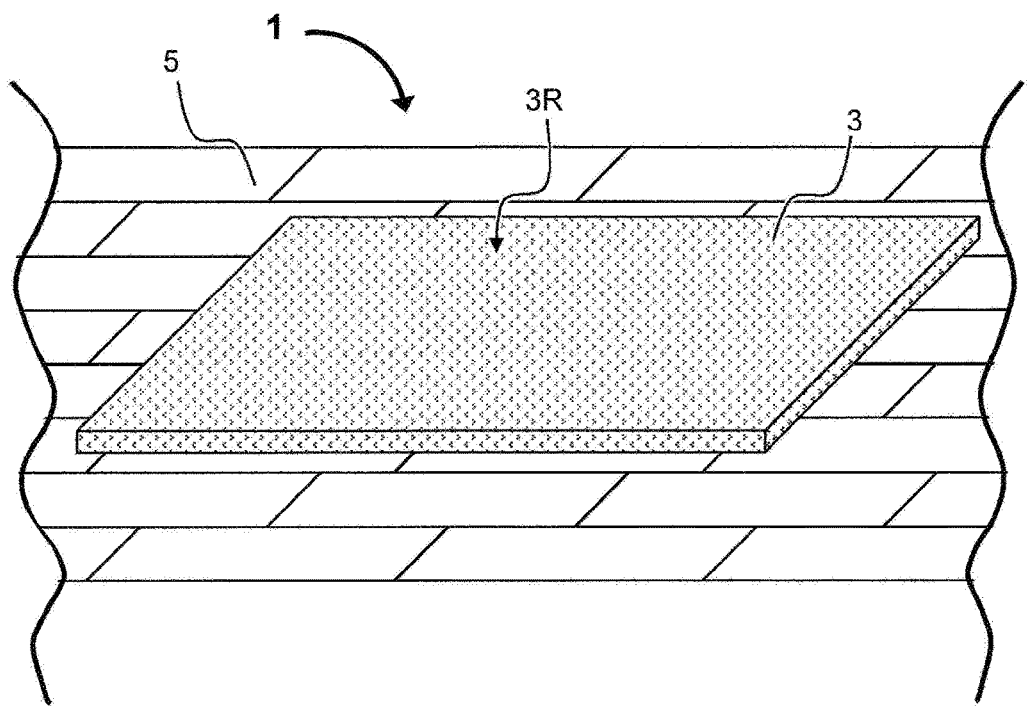
FIG. 6 is a perspective view of a decontaminating floor mat wherein the floor provides a base support structure for the viscoelastomeric thermoset overlay.

A unique attribute of the floor mats 1 equipped with the reaction product overlay 3 also resides in an ability to decontaminate adhesively engaged contaminants clinging to a contaminated saturated floor mat by conventional washing and sterilization techniques. Unlike conventional adhesively equipped floor mats which must be discarded upon contaminant saturation, the viscoelastomeric reaction product overlay 3 equipped floor mats 1 of this invention may be cleansed from the entrapped contaminants and restored to their original adhesive and cohesive floor mat efficacy. Surprisingly, conventional washing techniques (e.g., hand washing, scrubbing, dish machine washing, autoclaving, sterilization, etc.) may be effectively utilized to remove contaminants therefrom, and thereby permit a fully functional reuse of the cleansed floor mat. The antipathogenic floor mats 1 of this invention are equipped with an exposed surface region 3R comprising a thermoset reaction product overlay 3 adapted to adhesively remove contaminants from feet of footed people and/or animals placed thereupon, and thereafter cohesively release the cleansed feet, free from any adhesive residue. The floor mat 1 may rely solely upon the thermoset polymeric overlay 3 to provide the floor mat 1 as depicted by FIG. 6, or it may be incorporated as an active floor mat overlay 3 disposed upon a support structure 5 of the floor mat 1 as depicted by FIGS. 1-5. When the floor mat overlay 3 alone forms the floor mat 1, the viscoelastomeric reaction product overlay 3 may be adapted to be adhesively installed upon an alternative suitable support structure 5, such as a floor as depicted by FIG. 6.

Other uses for the present decontaminating floor mats 1 herein embrace a broad range of hygienic and medical uses. Accordingly, medical and dental clinics, hospitals, surgical operating sites, elderly care sites, and a host of other hygienic uses would greatly benefit from the ability to adhesively restrain and inhibit pathogenic invasion from outside sources via a unique viscoelastomeric reaction product floor mat overlay 3. Similarly business establishments, manufacturing facilities, public premises, arenas, restrooms, schools, spas, swimming pools, food processing plants, restaurants, cafeterias, showering sites, latrines, animal husbandry and a host of other uses would likewise greatly benefit from the hygienic floor mats 1 of this invention. The efficacy of the floor mat overlay 3 for removing sole borne contaminants renders the floor mat 1 herein especially useful for household uses. The effectiveness of the floor mats 1 in preventing the spread of sole-borne pathogens and contaminants allows for a safer environment.

The floor mat 1 of this invention is uniquely distinguishable from conventional floor mats through the incorporation of a releasable, cohesive, adhesive and viscoelastomeric thermoset reaction product as the decontaminating overlay 3 of the floor mat 1. The polymeric overlay 3 possessing viscoelastomeric, antipathogenic, adhesive and clean cohesive release properties provides an ideal decontaminating floor mat 1. The adhesive viscoelastomeric attributes coupled with its inherent cohesiveness will allow the floor mat overlay 3 to conform to the configuration of a foot sole exerting pressure upon its surface so as to effectively scavenge contaminants from recessed sole regions and adhesively retain the contaminants upon cohesive release of the foot soles therefrom. The adhesive and cohesive release attributes of the floor mat overlay 3 provide a wide latitude as to the particular form that it may be incorporated into the floor mat 1. Thin films and coatings of the floor mat overlay 3 measuring 1 mil (0.03 mm) or less will tend to retain their prefabricated structural cohesive integrity even when subjected to a substantive distorting force. For most coating applications of a base support 5, a floor mat reaction product overlay 3 of a coating thickness ranging from about 10 mil to about 300 mils (0.3 mm-7.6 mm) will suffice. The uniformity in adhesive and cohesive release properties throughout its entire structure contributes to an ability to use both the upper surface 3R and lower surface 3R' of the floor mat overlay 3 to decontaminate foot soles. The adhesive attributes also allow it to be adhesively placed upon any suitable base support 5, which may also involve its direct application to a floor as depicted by FIG. 6. Upon reaching contaminant saturation, the floor mat reaction product overlay 3 may be peeled away from the base support 5 with the contaminated surface region 3R being then placed upon the base support 5 allowing the previously unused lower surface 3R' of the floor mat overlay 3 to then be used to effectively decontaminate foot soles. Upon contaminant saturation of one or both surfaces 3R,3R', the floor mat overlay 3 may be appropriately washed free of contaminants and be fully restored to its original usefulness as a decontaminating floor mat 1.

Figure 1:
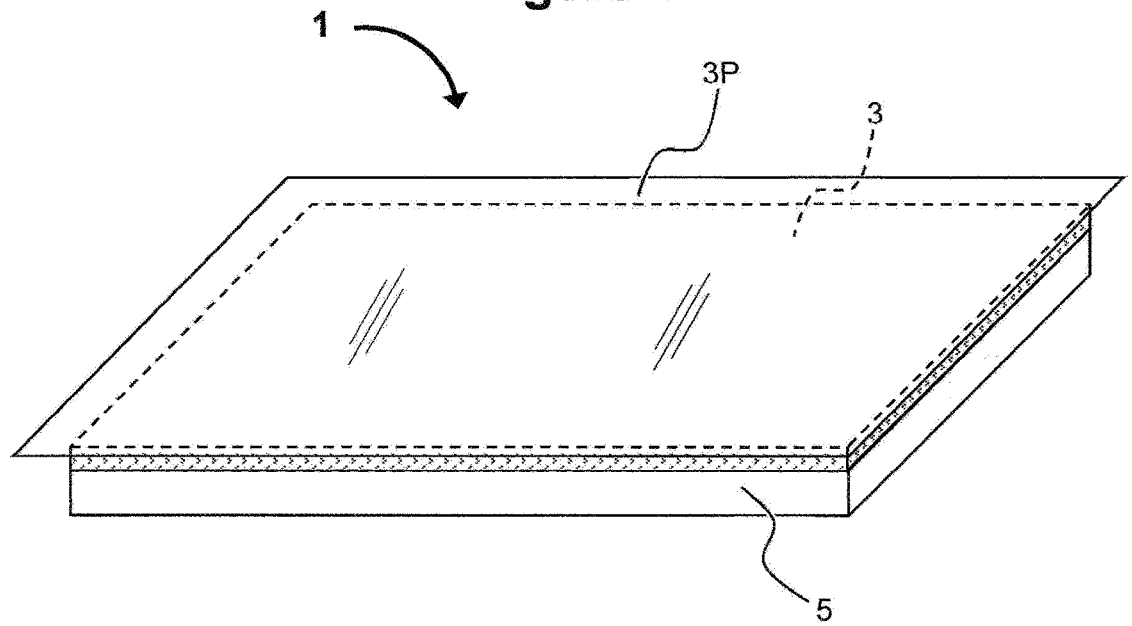
FIG. 1 depicts a perspective view of a decontaminating floor mat equipped with an antipathogenic, adhesive and cohesive viscoelastomeric thermoset overlay, and having a protective cover disposed thereupon.
Figure 2:
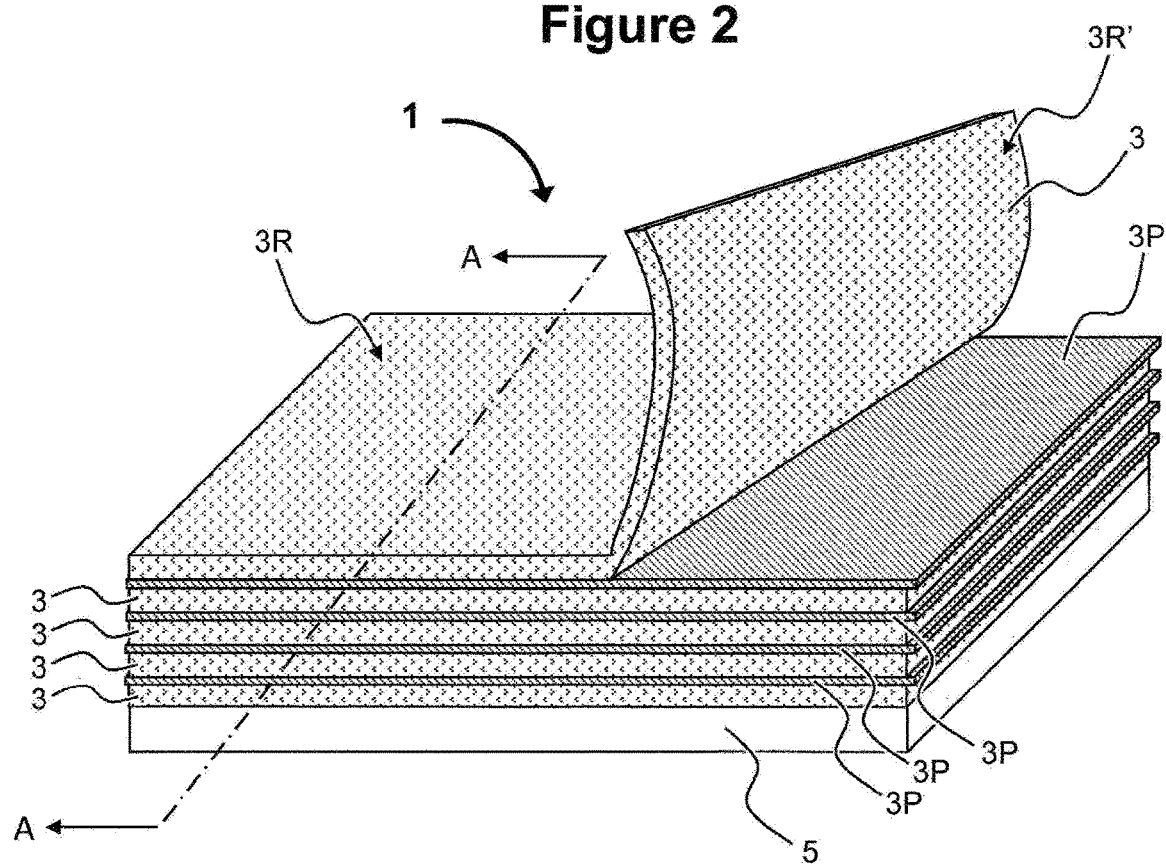
FIG. 2 depicts a perspective view of a decontaminating floor mat equipped with a stacked series of viscoelastomeric thermoset overlays.

FIG. 2 depicts the versatility of the reaction product overlay 3 when used as a decontaminating mat 1. Both the upper and lower surfaces 3R,3R' of the reaction product overlay 3 functionally serve as decontaminating surfaces 3R. Thus the stacked assembly shown in FIG. 2 allows both surfaces 3R,3R' of the reaction product overlay 3 to effectively serve as decontaminating surfaces.

As evident from the aforementioned, the configuration and thickness of the floor mat reaction product overlay 3 may vary greatly depending upon its end usage. When provided in a sheet or a film form, its thickness may vary over a broad range (e.g., about 10 mil to about 300 mil (0.3 mm-7.6 mm) or greater), with thicker sheets or pads (e.g., 100 mil to 1,000 mil (2.5 mm-25.4 mm)) of the reaction product overlay 3 being more adaptable to those decontaminating applications necessitating a deeper sole penetration. Although a thicker reaction product overlay 3 can be especially useful for those applications involving direct floor installation, the reaction product overlay 3 cohesiveness also permits the direct application of relatively thin films to floor surfaces which would be more appropriate for less strenuous uses, such as dust removal.

Figure 3:
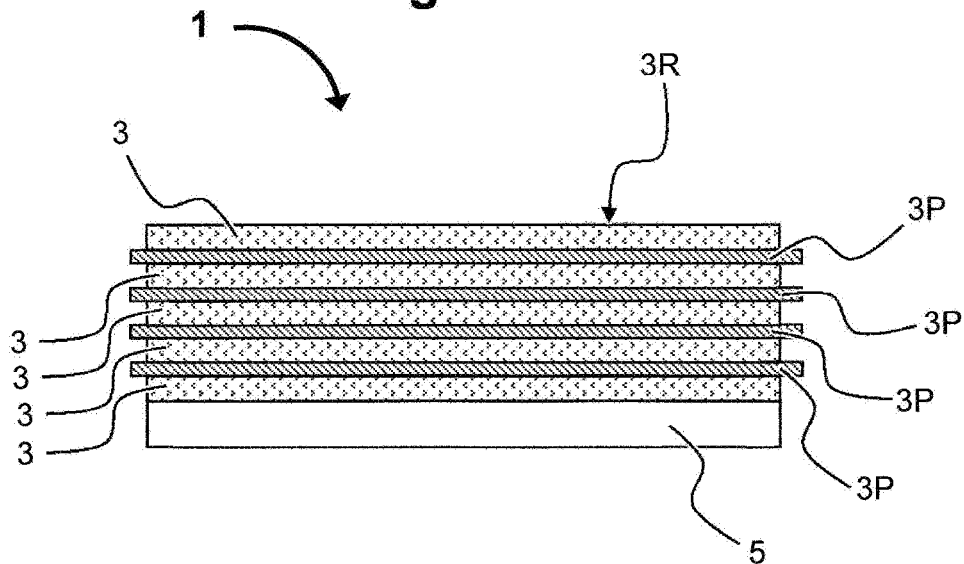
FIG. 3 is a cross-sectional view taken along line A-A of the decontaminating floor mat of FIG. 2.

The highly adhesive characteristics of the reaction product overlay 3 render it especially prone to become contaminated with entrapped contaminants. It is therefore advisable to protectively cover the exposed reaction product overlay surfaces 3R,3R' with a protective cover 3P as depicted by FIGS. 1-4, which may be removed at the site of use. For ease of removal, protective coverings 3P having a relatively low level of adhesiveness to the reaction product overlay 3 (e.g., plastic films such as PVC, paraffin wax coated substrates, TEFLON coated substrates, etc.) may be effectively used for this purpose. Similarly, when stacking a plurality of the viscoelastomeric reaction product overlays 3 together, a separating protective cover 3P of a low adhesiveness to the reaction product overlay 3 as illustrated by FIGS. 2-4 may be utilized to facilitate a separation of one layered reaction product overlay 3 from another.

Although the invention broadly applies to any polymeric adhesive possessing the unique antipathogenic, decontaminating, cohesive release and adhesive attributes mentioned herein, there exists a particular class of thermoset viscoelastomeric reaction products which have been found to be particularly well suited for use as the decontaminating reaction product overlay 3 herein. Such a unique thermoset viscoelastomeric reaction product overlay 3 may be derived from a thermosetting reaction media comprised of a substantially uniform admixture of an isocyanate prepolymer, prescribed amounts of polyether diols and triols, and a careful balance of select plasticizers. The isocyanate prepolymer in combination with a balanced ratio and amount of straight chain diols and cross-linking triols provides a thermoset infrastructure for effectively housing the plasticizing overlays in a form which unexpectedly contributes to its unique antipathogenic, viscoelastomeric, adhesive and cohesive attributes, while also permitting a restorative decontaminating function by conventional washing and autoclaving techniques.

A highly effective reaction media for preparing the cohesive viscoelastomeric and adhesive reaction product overlay 3 herein involves providing a thermosetting reaction media containing about 25 percent to less than about 52 percent by weight plasticizer having an epoxidized triglyceride plasticizer content of less than about 50 percent, from about 35 percent by weight to about 55 percent by weight of straight chain linking diols and cross-linking polyols, and from about 4 percent to about 8 percent by weight of an isocyanate prepolymer (e.g., such as a polyol reacted with an isocyanate). The content and the type of polyol reactants in conjunction with the effective use of select plasticizers has been found to have a pronounced effect upon imparting the necessary thermoset polymeric infrastructure for preparing the desired antipathogenic adhesive and cohesive attributes for use as the reaction product overlay 3 for the decontaminating floor mats 1 herein. An appropriate balance between straight chain producing diols and cross-linking polyols (e.g., triols) thus provides a reaction media particularly well suited for preparing a polyurethane reaction product overlay 3 possessing unexpected superior properties for use as the decontaminating floor mats 1 herein.

The diols and triols are typically liquid at room temperature (e.g., 20° C.) and generally have a molecular weight in excess of about 1,000 but less than about 10,000. The diol may be more suitably provided by a polyether diol having a molecular weight ranging from about 2,000 to about 6,000 in an amount ranging from about 10 percent to about 20 percent by weight of the reaction product weight. The diol provides sufficient cross-linkage disruption and straight chain infrastructure to permit for a highly effective loading of the thermoset reaction product with the cohesive and adhesive plasticizer cofactors. The triol will typically comprise a polyether triol (typically of a molecular weight ranging from about 3,000 to about 7,000) which is most suitably present in the reaction media in an amount from about 25 percent to about 35 percent by weight of the reaction product weight. The reaction media also suitably includes a polyurethane precursor (frequently referred to as a prepolymer) in amount typically ranging from about 4 percent to about 7 percent by weight (e.g., diisocyanate prepolymer) and from about 20 percent to about 48 percent by weight plasticizer cohesively bound within the thermoset reaction infrastructure.

Adhesiveness and cohesiveness of the thermoset reaction product depends upon using a proper polyol balance within the thermosetting reaction media. It has been found that when the weight ratio of diols to triols in the presence of an effective amount of plasticizer within the reaction media falls outside a prescribed diol to triol weight ratio of about 1:2 to about 2:1 (more particularly about 7:13 to about 13:7), the resultant reaction media will generally fail to provide the desired adhesive and cohesive release attributes for effective use herein. The content and the type of the linking polyols will have a pronounced effect upon imparting the necessary thermoset polymeric infrastructure for preparing the viscoelastomeric reaction product overlay 3 attributes herein. An appropriate balance between the straight chain producing diols and cross-linking polyols (e.g., triols) provides an effective reaction media for preparing a thermoset viscoelastomer polyurethane reaction product uniquely possessing the desirable antipathogenic, cohesive and adhesive compositional properties for use as a decontaminating reaction product overlay 3 herein. Floor mat applications requiring a higher degree of adhesiveness typically contain a higher diol to triol weight ratio, with a higher concentration of diol to triol within about a 3:1 to 1:3 weight ratio favoring more adhesiveness.

The overall tackiness and adhesiveness of the thermoset reaction product and its concomitant releasability characteristics may accordingly be effectively altered by changing the compositional makeup of the thermosetting reaction media, particularly by the diol to triol reaction media ratio, as well as the reaction media plasticizer content and type of plasticizer. Thus, the cohesive and adhesive attributes of the reaction product overlay 3 of the decontaminating floor mat 1 herein may be tailored to meet a desired level of adhesiveness and cohesiveness for any given end usage. An effective manner of altering the adhesion release strength of the reaction product overlay 3 accordingly involves altering the diol to triol reactant ratio in the thermosetting reaction media. In general, the adhesion release strength will decrease (i.e. become less tacky) as the triol reactant increases relative to the diol content, and will increase (i.e. will become more tacky) when the diol content increases relative to the triol content. In order to compensate for a diol reaction media increase, a slight increase in the diisocyanate reactant amount will generally serve to balance the reaction media reactants. It has been observed herein that a reaction product overlay 3 exhibiting higher adhesion release strength value will tend to tenaciously "string out" upon separation from an adhered item (similar in looks to the pulling of heated candy taffy) until a clean cohesive separation ultimately occurs, whereupon the reaction product overlay 3 will then return to its innate form. The high tack levels are prone to make it more difficult for the of the decontaminating floor mat 1 to release the engaged object (e.g., a sole) from the floor mat 1, but are effective for removing relatively heavier contaminants.

The diol may be provided by a polyether diol having a molecular weight most suitably ranging from about 2,000 to about 6,000 in an amount ranging from about 10 percent to about 20 percent by weight of the reaction media weight (which is equivalent to the reaction product weight). The diol provides sufficient cross-linkage disruption and straight chain infrastructure formation for intermolecular plasticizer attraction and alignment so as to permit a highly effective loading of the viscoelastomeric thermoset with the antipathogenic, cohesive and adhesive contributing plasticizer co-factor. The cross-linking triol content may be suitably provided by a polyether triol (typically of a molecular weight ranging from about 3,000 to about 7,000) in an amount ranging from about 25 percent to about 35 percent by weight of the reaction media weight. The reaction media also suitably includes a conventional polyurethane precursor (e.g., prepolymer) typically in amount from about 4 percent to about 7 percent by weight (e.g., diisocyanate prepolymer), and from about 20 percent to about 48 percent by weight of a plasticizer uniformly bound within the thermoset reaction infrastructure.

From a molecular infrastructure viewpoint, the unique combination of cross-linking reactants and plasticizer types in prescribed amounts appears to create a uniquely different thermoset reaction product 3 which is especially useful in floor mat applications. The appropriate balance between diol and triol reactants appears to create long chain polarized sites ideal for powerful cohesive polar entrapment of the plasticizer while also aligning the plasticizer in a powerful cohesive and adhesive positioning within the reaction product overlay 3. The polarized molecular alignment of the plasticizer cofactor within the reaction product infrastructure contributes to a highly cohesive structure which maintains its molecular integrity when subjected to forces tending to cause adhesive separation (e.g., adhesive release factor). The plasticizer also appears to be a major contributing factor in imparting unique antipathogenic and plasticizing effects resulting in its unique viscoelastomeric properties. Although it may be difficult to precisely ascertain the precise molecular makeup of the reaction product overlay 3, it is readily apparent that the reaction product overlay 3 possesses a host of unexpectedly unique and superior properties over conventional floor mat adhesive products.

Notwithstanding substantial distortion, the reaction product overlay 3 of the floor mat 1 will also tenaciously cling to contaminants adhesively transferred to the floor mat 1. The overall tackiness and adhesiveness of the viscoelastomeric thermoset equipped floor mat 1 and its concomitant releasability characteristics may be altered by the compositional makeup of the thermosetting reaction media used to prepare the reaction product overlays 3, and particularly by the diol to triol reaction media ratio, as well as the reaction media plasticizer content and type of plasticizer. Thus, the cohesive and adhesive attributes of the reaction product overlay 3 may be tailored to meet the desired level of adhesiveness for use of the decontaminating floor mat 1. For example, floor mats 1 designed for dust removal may employ a less adhesive reaction product overlay 3 than a floor mat 1 designed to remove heavier or more deep-seated contaminants. An effective manner for regulating the adhesion release strength of the thermoset overlay 5 involves altering the diol to triol reactant ratio of the thermosetting reaction media. In general, within the prescribed diol to triol weight ratios as mentioned herein, the adhesion release strength will decrease as the triol reactant content increases, with a concomitant adhesiveness increase when the diol content increases. In order to compensate for a diol reaction media increase, a slight increase in the diisocyanate prepolymer reactant amount will generally serve to balance the reaction media reactants. As previously mentioned, higher adhesion release strength values will tend to cause the reaction product overlay 3 to tenaciously string out (similar in looks to the pulling of heated candy taffy) until a clean adhesive separation ultimately occurs, whereupon the reaction product overlay 3 surprisingly cohesively returns to its innate form. The high tack levels may render it more difficult to easily effectuate a release of the decontaminated foot or shoe sole from the floor mat 1, which becomes especially more pronounced at higher adhesion release levels.

An effective reaction product overlay 3 will characteristically possesses a unique capacity to adhesively retain pathogens and air-borne contaminants, while also allowing for an effective release of decontaminated foot soles therefrom upon an application of an outwardly counteracting force sufficient to overcome the adhesive force attraction between the foot sole and decontaminating floor mat 1. The thermoset reaction product overlay 3 also possesses a tenacious internal compositional cohesiveness, as evidenced by its ability to break cleanly away from its adhesive bonding to a foot sole. Characteristically, upon adhesive separation, the reaction product overlay 3 of the decontaminating floor mat 1 will return to its substantially intact and innate form with no more than a minuscule level of the reaction product overlay 3 residue adhering to the separated foot sole. Upon separation, there will typically exist no visible evidence of the reaction product overlay 3 residue remaining upon the separated foot sole. After separation, the reaction product overlay 3 will readily return to its innate form. The extent of reaction product overlay 3 distortion upon exposure to separation forces will depend largely upon the adhesiveness of the reaction product overlay 3.

The plasticized cross-linked polymeric structure of the thermoset polymerizate obtained from an appropriate thermoset reaction media balance provides an ideal infrastructure for effectively harboring plasticizing overlays in an unexpectedly superior cohesive and adhesive environment, while also contributing to the highly desired and effective antipathogenic properties possessed by the decontaminating reaction product overlay 3. The plasticizers are also deemed as a contributing factor in imparting the desired viscoelastomeric properties to the reaction product overlay 3. The plasticizer is uniformly incorporated into the thermosetting reaction media along with the other polymerizable thermosetting constituents and will tenaciously remain uniformly dispersed within the resultant thermoset reaction product in a highly cohesive and stabilized antipathogenic form. Broadly, the amount of plasticizer within the reaction media may range from about 20 percent to about 55 percent by weight of the total reaction media weight with the plasticizer being uniformly dispersed and cohesively bound throughout the reaction media, as well as in the resultant thermoset viscoelastomer reaction product overlay 3 derived therefrom. Most appropriately, the thermosetting reaction media used in providing a highly effective reaction product overlay 3 will contain from about 20 percent to about 48 percent by weight plasticizer. The plasticizer content will typically constitute from about 20 percent to about 48 percent by weight of a triglyceride plasticizer (e.g., an epoxidized triglyceride) and from about 0 percent to about 40 percent by weight of an ester plasticizer, which is most typically provided as a diester plasticizer. The thermosetting diols and triols in cooperative combination with the plasticizer create an antipathogenic environment. as well as a thermoset viscoelastomeric polymeric structure possessing the high degree of compositional adhesiveness and cohesiveness necessary to adhesively secure and retain foot bound contaminants while also allowing for a clean cohesive separation from a decontaminated foot or shoe sole. The type of plasticizer and reactants in monitored amounts can also be effectively utilized to provide desirable thermosetting fabricating conditions for preparing the reaction product overlay 3 and thereby provide a decontaminating floor mat 1 possessing the unique floor mat attributes herein. Typically, the reaction media will consist essentially of liquid reactants.

Irrespective of what form the reaction product overlay 3 is provided in the floor mat 1, the viscosity characteristics of uncured thermosetting reaction media of the reaction product may be effectively tailored so as to provide a workable viscosity for effectively making the desired reaction product overlay 3. The thermosetting reaction media for preparing the thermoset reaction product overlay may accordingly be characteristically formulated to possess the desired (e.g., film forming, coating, molding, casting, etc.) properties at appropriate viscosity levels during the initial formative thermosetting stages of the thermosetting reaction. The onset viscosity of the reaction media may be accordingly suitably formulated so as possess sufficient fluidity to allow for the preforming of coatings, films, casting, moldings or other preforming processes as typically conducted under conventional thermoset molding, casting, etc. techniques. In applying the reaction product to a suitable substrate, procedurally a measured amount of the composition of fluid thermosetting reaction media reactants may be deposited or casted upon a suitable fabricating support and allowed to spread evenly (due to desirable casting viscosities) and thereafter cured in situ to provide the desired reaction product overlay 3. Controlling the initial viscosity properties of the thermosetting reaction media provides a convenient manufacturing procedure for preforming the reaction product overlay 3 into a desired end product form, including casted or coated forms thereof. Thus, conventional calendaring, casting, molding, coating, etc. thermosetting film forming techniques may, at a workable viscosity range, be effectively used to prepare the reaction product overlay 3 in either a coated, solid sheet or film form. When applying the thermosetting reaction media to a suitable floor mat support 5 (e.g., threaded mat, rubber mat, bristled mat, plastic base support, etc.), the reaction media upon curing will tenaciously bond to an appropriate supportive base 5.

The reaction product overlay 3 for the decontaminating mat 1 may be provided in a preformed casted solid form for use as an adhesive overlay or as a reaction product overlay derived from a thermosetting reaction media of an uncured coating applied to a suitable supportive base 5. Due to its exceptional adhesive qualities, the overlay 3 may be provided as a coating, film, sheet, insert etc. or other suitable overlay form, which due to its tack, will tenaciously adhesively adhere to any suitable supportive base 5 until a counteracting force causes its adhesive removal. Alternatively, the reaction product overlay 3 may be directly bonded in situ to a suitable substrate 5 by applying a flowable composition of the thermosetting reaction media reactants onto the suitable supportive base structure 5, and thereafter allowing the reaction media to cure in situ, to provide a thermoset viscoelastomeric coating 3 bonded by thermosetting to the supportive structure 5.

By adjusting the plasticizer content and type, the thermosetting characteristics of the reaction media, including the ultimate thermoset tack, as well as the onset reaction media thermosetting viscosity characteristics, the thermosetting reaction media viscosity may be thereby effectively altered so as to suit a particular type of manufacture. For example, effective casting of the reaction media to produce the desired reaction product overlay 3 will require a workable viscosity to yield the desired reaction product overlay 3. This generally entails a pouring, injecting, casting, etc. of the thermosetting reaction media at workable viscosity onto a suitable support (which may be a temporary support) to provide the desired casted, coated, film, sheeted, etc. form for the reaction product overlay 3. Particularly suitable for providing an effective preformed reaction media involves formulating the reaction media with an effective amount of viscosity reducing plasticizers and especially the dialkyl esters of dicarboxylic acids which generally impart sufficient onset fluidity reduction, so as to provide a thermosetting reaction media which may be easily poured, molded or casted in a desired form during its initial thermosetting stages. Characteristically, these dialkyl ester plasticizers are fluid at room temperature (e.g., 20° C.) and have a molecular weight of less than about 500. Exemplary thereof are the condensation products of alcohols (e.g., the $C_1$ to $C_{10}$ alcohols) and the $C_2$-$C_{12}$ dicarboxylic acids, and particularly the condensates of a $C_4$-$C_8$ dicarboxylic acids and the $C_2$ to $C_6$ alcohols. Typically, the total plasticizer concentration for preforming fabrication will most suitably range from about 20 percent to about 45 percent by weight of the reaction media weight, and most typically ranges from about 25 percent to about 40 percent by weight. The weight ratio of epoxidized triglyceride to non-epoxidized plasticizer (e.g., diesters) within the reaction media will most suitably range from about 1:0 to about 1:3. For certain applications requiring a viscosity reduction, an epoxidized triglyceride plasticizer to ester plasticizer weight ratio will range from about 2:1 to about 1:2, most suitably about 1:1 to about 3:1.

If the amount of triglyceride plasticizer is excessively high, the resultant reaction product will tend to lose its cohesiveness and bleed plasticizer. Adjusting the triol content to a higher level will serve to partially arrest plasticizer bleeding, but will nonetheless generally result in an undesirable decrease in adhesiveness. The reaction product of the overlay 3 may contain less than 50 percent by weight of the epoxidized triglyceride plasticizer at an upper weight ratio of an epoxidized triglyceride plasticizer to ester plasticizer of about 1:1 or less. At more elevated ester plasticizer levels, the reaction product tends to lose its desirable cohesiveness.

The ester plasticizer in molding or casting procedures involving bristled brushes, or wherein the preforming mold contains depressions, requires the thermosetting reaction media to uniformly flow into and fill the depressions. Epoxidized triglyceride plasticizer to ester plasticizer weight ratios ranging from about 2:1 to about 3:1 have been found to be particularly useful for these applications.

Since it is desirable for certain manufacturing applications to use a less viscous fluid thermosetting reaction media, the more fluid diester plasticizers are particularly effective for this purpose. The enhanced fluidity characteristics become particularly useful in casting procedures, such as the casting of a sheet or thin film or coating upon a suitable preforming base. Such thermosetting casting techniques, when applied to a floor mat base or support 5, tend to create a tenacious bonding between the cured reaction product overlay 3 and the supportive base 5. Amongst the more fluid diester plasticizers are the lower dialkyl esters of dicarboxylic acids. Exemplary thereof are the dialkyl esters having alkyl groupings of less than 12 carbon atoms, and more typically of the $C_1$ to $C_8$ dialkyl ester grouping of sebacates, the adipates, the isophathalates, the phathalates, the maleates, the azelates, the gluterates, etc. The total plasticizer concentration in such casting manufacturing techniques will most suitably range from about 20 percent to about 45 percent by weight, and most typically range from about 25 percent to about 40 percent by weight, with the weight ratio of epoxidized triglyceride plasticizer to non-epoxidized plasticizer (e.g., diesters) typically ranging from about 1:0 to about 3:1, and most typically from about 1:1 to about 3:1. Due to the availability and excellent reaction media viscosity traits and end product characteristics, dibutyl sebacate provides a highly effective dialkyl ester plasticizer source. An appropriate balance of triglyceride and dialkyl ester plasticizers is suitably designed to provide the desired operational thermosetting viscosity levels for the manufacture of the reaction product overlay 3. On a reaction media weight basis, the dialkyl ester plasticizer content for casting purposes will more desirably range from about 1 percent to about 20 percent by weight, and most typically from about 5 percent to about 15 percent by weight of the total reaction media weight.

Although the antipathogenic viscoelastomeric thermoset reaction product overlay 3 generally possesses unexpectedly superior adhesiveness (adjustable via reactant modification to a desired degree of adhesiveness), the thermoset reaction overlay 3 as used herein will also possess unexpectedly superior cohesive release attributes. Upon exposure to an adhesive separating release force (e.g., such as pulling an adhesively engaged shoe sole away from its adhesive engagement), the compositional cohesiveness of the thermoset reaction overlay 3 will tenaciously retain its viscoelastomeric structural integrity by separating cleanly from a foot sole without leaving more than a trace compositional residue upon the separated foot sole. As the reaction product tack level increases, there arises a corresponding cohesive and adhesive tendency with the reaction product overlay 3 to pull away from the adhesively engaged sole in a taffy-like manner until the floor mat overlay 3 completely separates or breaks cleanly away from the separated foot sole. However, the stretched portion of the reaction product overlay 3 tends to forthrightly cohesively return to its innate floor mat 1 form.

The decontaminating reaction product overlay 3 may be provided in a preformed insertable overlay 3 form. In this overlay form, a preformed insertable overlay 3 of the reaction product may be bonded by adhesively placing the adhesive reaction product overlay onto a suitable structural support 5. Due to its exceptional adhesive and cohesive qualities the reaction product overlay 3 may be provided in a film, sheet, strip, insert etc. form which, due to its tackiness, will tenaciously adhesively adhere onto any suitable support 5 (e.g., including a floor) until encountering a counteracting force sufficient to cause its separation. Alternatively the thermosetting reaction media for forming reaction product overlay 3 may be directly bonded in situ onto a suitable support 5 by applying a fluid thermosetting reaction media of the thermosetting reactants to the support 5 and thereafter allowing the reaction media to cure in situ to provide a thermosetting reaction product overlay 3 bonded to the support 5. In situ thermosetting tends to create a more tenacious bonding.

The cross-linked polymeric structure of the thermoset polymerizate obtained from an appropriate thermoset reaction media provides an ideal infrastructure for effectively harboring plasticizer in an unexpectedly superior cohesive and adhesive form while also providing superior antipathogenic viscoelastomeric properties. The plasticizer is uniformly incorporated throughout the reaction media and remains uniformly dispersed within the resultant thermoset reaction product in a highly cohesive form.

Suitable triglyceride plasticizers for preparing the reaction product overlay 3 have been more extensively described in the aforementioned cross-referenced related applications, which have been incorporated herein in their entirety. Amongst the triglyceride plasticizers, the epoxidized vegetable oils (e.g., cottonseed, soybean, sunflower, etc.), and particularly the epoxidized soybean oils, serve as highly effective vegetable oil-based plasticizers. It appears that the cross-linked infrastructure and the polarity provided by the polymerized polyether diol and triol orients the polarized plasticizer within the thermoset reaction product so as to impart the unexpected antipathogenic, cohesive and adhesive properties to the reaction product overlay 3 herein. Thus, the thermosetting diols and triols in cooperative combination with the plasticizer create a thermoset polymeric structure possessing a high degree of compositional adhesiveness and cohesiveness for effective floor mat usage, while also allowing for a clean cohesive separation from the decontaminated articles, such as a shoe sole.

The decontaminating floor mats herein tenaciously retain structural integrity by cohesively separating cleanly from the decontaminated objects (e.g., shoe soles) without leaving more than a trace of compositional residue upon the separated objects, while still captively retaining contaminants, such as dust and pathogens, from separated objects. As the tack level of the reaction product overlay 3 increases, there arises a cohesive and adhesive tendency for a portion of the reaction product overlay 3 to adhesively pull away from an adhesively engaged object in a taffy-like manner until it completely separates or breaks cleanly away from the separating object. The stretched portion of the reaction product overlay 3 will then readily cohesively return to its innate form within a brief time interval.

The reaction product overlay 3 possesses unique viscoelastomeric properties which allow it, under pressure, to conform to the object exerting the pressure (e.g., the weight of a shoe sole) upon the reaction product overlay 3. Thus, by slightly oversizing the depth of a reaction overlay 3 so as to allow for decontamination of a deep threaded shoe sole, effective sole decontamination thereof may be achieved. Due to the cohesiveness and viscoelastomeric properties of the reaction product overlay 3, the thickness of the reaction product overlay 3 may be accordingly adjusted to meet any desired application use.

In a molded solid form, the reaction product overlay 3 may be provided as a sheeted mat which can serve as both the floor mat 1 and as the floor mat overlay 3 herein. In direct floor applications, a mat of the reaction overlay 3 may be directly adhesively applied to a floor 5, thus such that the floor can then serve as a supportive base 5. Due to its exceptional cohesiveness, relatively thin sheets of films of the reaction product overlay 3 may be used. In such direct floor applications, a reaction product overlay 3 as thin as 10 mil (0.3 mm) may be applied to the floor. Thicker sheets or films may also be used, but are generally unnecessary, except for those applications involving deep-seated contaminants. Sheets of less than 1,000 mil (25.4 mm) or thicker, and most typically of about 50 mil to about 500 mil (1.3 mm-12.8 mm) or thicker, may be effectively utilized as floor mats 1. However, it should be understood that overlays 3 having a thickness of greater than 1,000 mil (25.4 mm) are also suitable for use in the invention herein without departing from the scope of the invention.

The manner in which the reaction product overlay 3 is incorporated and used as a floor mat 1 will depend largely upon its intended end usage. In applications where a smooth surfaced adhesive will effectively remove contaminants, the reaction product overlay 3 may be provided or incorporated within the floor mat 1 in a substantially flat surface form. Exemplary objects which may be decontaminated with relatively flat surfaced thermoset reaction product overlays 3 herein include relatively smooth surfaced shoe soles with minor treading, dust decontamination procedures, bare footed people and/or animals, and the like. The type of decontamination required by the user will primarily dictate the type of floor mat 1 best suited to effectuate the decontamination. For example, dust particles loosely cling to soles which may be easily removed upon adhesive contact. In contrast, deep threaded shoe soles will render it more difficult to make adhesive contact with contaminants deeply recessed within the shoe sole threads, all of which will generally require a reaction product overlay 3 modification to meet its intended use. Under such circumstances, deep sole tread penetration may be accomplished by coating or impregnating the bristles of a conventional bristled floor mat as depicted by FIG. 5 with the decontaminating reaction product overlay 3, which will then conform to the shape of the sole when subjected to a sole cleansing action. Similarly, the interfacing surface region 3R of the reaction product overlay 3 may be suitably altered to more effectively match the application of its intended use.

Relatively thin films, coatings or sheets (e.g., 25 mil (0.6 mm) thickness or less) of the reaction product have been found to be surprisingly effective in decontaminating contaminated objects for certain applications. In the absence of auxiliary features to sweep contaminants (e.g., brush bristles) from foot soles, an increase in the overall reaction product overlay thickness (e.g., one inch (2.5 mm) or more) may be effectively used to adhesively encroach upon and remove deep seated contaminants. Accordingly, the reaction product overlay 3 itself may serve to effectively scavenge contaminants from difficult to access sole areas. Such a unique capacity to retrieve contaminants from difficult to reach sole areas arises because the reaction product overlay 3 possesses viscoelastomeric properties. Consequently, upon receiving pressure from a user (e.g., an impressed foot sole), the reaction product overlay 3 will viscoelastomerically conform to the exerted pressure to reach deep-seated sole recesses and thereby effectively extract the contaminants therefrom. Upon a release of the pressure, the reaction product overlay 3 will return to its innate form carrying along the contaminants being adhesively retained thereto.

The end use of the floor mats 1 and the reaction product overlay 3 of this invention typically includes a supportive base 5 to effectuate its decontaminating features, though it need not be. This supportive base 5 may simply consist of a floor (as depicted by FIG. 6) upon which the floor mat 1 (namely the reaction product overlay 3) is emplaced, or any other suitable supportive base 3, such as depicted by FIGS. 2-5. Accordingly, the reaction product overlay 3 may be incorporated into the construction of conventional floor mats (e.g., rubber mats, textile-based mats, bristled mats, etc.) or used per se as a floor mat, or provided in a manner similar to conventional dust collecting mats. The latter may typically entail providing stacked protective covers 3P coated with the reaction product overlay 3 (as illustrated by FIGS. 2-4) which may be shifted aside upon contaminant saturation to make interfacial room for an unsaturated reaction product overlay 3 which then undertakes the decontamination operation.

Since the reaction product overlay 3 has a propensity to adhere to air borne and other foreign contaminants before being placed into operational use, it may be advisable to prepackage the freshly manufactured reaction product overlay 3 with a protective cover 3P which may be removed or peeled away at the site of use to thereby expose the uncontaminated surface for operational use.

In addition to the numerous benefits enumerated above, the floor mats 1 herein can also benefit from the reconditioning attributes of excessively contaminated floor mats 1, which permits repeated reuse of the floor mat 1 after being decontaminated by conventional cleansing techniques as mentioned herein. Thus, even though the initial floor mat 1 cost may be more expensive than conventional floor mats, the reaction product overlay's 3 reusability attributes provides substantial cost savings over extended periods of use.

EXAMPLES

Example 1

An antipathogenic, viscoelastomeric thermoset reaction product overlay 3 possessing exceptional cohesive release and adhesive properties was prepared from a uniform reaction media admixture of the following A-mix and B-mix ingredients.

| A-Mix: Ingredients | Percent by Weight: |
|---|---|
| Methylene diphenyl diisocyanate based glycol prepolymer (ELASTOCAST TQZP23, available from BASF Corporation) | 6.51% |
| Epoxidized soybean oil | 26.73% |
| Dibutyl sebacate | 8.91% |

| B-Mix: Ingredients | Percent by Weight: |
|---|---|
| Polyether triol (ELASTOCAST C-4018, available from BASF Corporation) | 30.79% |
| Polyether diol (ELASTOCAST C-4057, available from BASF Corporation) | 25.11% |
| Catalyst (COSCAT 83, available from Vertellus Holdings LLC) | 0.16% |
| UV inhibitor (TINUVIN B75, available from BASF Corporation) | 1.30% |
| Colorant | 0.49% |
| Total | 100% |

The thermosetting reaction media possessed excellent onset viscosity properties rendering the reaction media particularly useful for prefabricating the thermosetting reaction media into the following desired thermoset reaction product overlay 3 forms.

Example A—Polypropylene Coated Plastic Sheet

A pre-flamed polypropylene 6 mil sheet measuring 12-inch×18-inch was prepared by uniformly casting a sufficient amount of the uncured reaction media to provide a cured reaction product overlay coating 3 of a uniform 40 mil (1 mm) thickness bonded to the polypropylene sheet. Such a polypropylene plastic sheet coated with the thermoset reaction overlay 3 is illustratively depicted by the floor mat of FIGS. 1-3.

Example B—Bristled Brush Mat

The uncured reaction media was utilized to uniformly coat the bristles of a bristled floor mat with a thin uncured coating of the reaction product overlay as illustratively depicted by FIG. 5. It was observed that the base of the coated bristles were embedded within a bed of the reaction product overlay 3.

Example C—Thick Reaction Product Overlay 3 for Direct Use as a Floor Mat

A 500 mil (12.7 mm) thick cured reaction product overlay measuring one-foot square was prepared by uniformly casting a sufficient amount of the aforementioned reaction media within a square foot PVC mold. The thermosetting reaction media was allowed to thermoset for a sufficient time interval to provide a cured solid viscoelastomeric reaction product overlay 3 of this invention, which resembled the floor mat illustratively depicted by FIG. 6.

The exemplary thermoset reaction product overlays 3 above, as provided in the desired forms for use as decontaminating floor mats 1, were found to exhibit exceptional antipathogenic, viscoelastomeric, cohesive release, and adhesive properties for floor mat use. In the example utilizing polypropylene sheets coated with the cured reaction product overlay coating 3 (i.e., Example A above), the floor mats 1 were especially adapted for use in removing contaminants from relatively smooth soled surfaces. In contrast, in the example utilizing the reaction product overlay coated 3 floor mat bristles (i.e., Example B above), as well as the example utilizing the thicker reaction product overlay 3 (i.e., Example C above), were especially effective in removing deep seated contaminants from deep threaded soles. The thickness of the thick floor mat reaction product overlay 3 of Example C above effectively provided a floor mat 1 which followed the contour of deeply recessed sole areas and thereby adhesively clung onto and removed deep seated contaminants therefrom. Upon removal of the shoe sole, the reaction product overlay 3 (especially with regard to the floor mat 1 of Example C above) readily returned to its innate form, while retaining the contaminants adhesively adhered thereto.

Upon reaching contaminant saturation of the solid floor mat (i.e., Example C above) of the initial upwardly facing reaction product overlay surface 3R of the floor mat 1, the overlay 3 may be cohesively removed from the floor and then flipped such that the previously upwardly facing surface 3R is then adhesively placed in a downwardly facing position upon the floor, thus allowing the previously unused underside surface 3R' of the floor mat 1 to then be used as the decontaminating surface region.

In addition, upon reaching contaminant saturation, all of the aforementioned coatings, sheets and mats of the reaction product overlays 3 were found to be restorable to their original decontaminating adhesive and cohesive condition by scrubbing with a conventional dish washing detergent. The cured reaction product overlays 3 characteristically possessed antipathogenic properties (e.g., did not foster microbial growth).

What is claimed is:

1. An antipathogenic floor mat equipped with an exposed surface region of a viscoelastomeric thermoset reaction product overlay adapted to adhesively remove contaminants from footed soles placed thereupon and cohesively release from the footed soles, said reaction product overlay being derived from a thermosetting reaction media comprised of a substantially uniform admixture of from about 4 to about 8 percent by weight isocyanate prepolymer, from about 35 to about 55 percent by weight polyols with said polyols consisting essentially of straight chain linking diols and cross-linking triols each characterized as having repetitive ether groups at a diol to triol weight ratio ranging from about 1:2 to about 2:1, and from about 20 to about 55 percent by weight of a plasticizer containing less than about 50 percent by weight of an epoxidized triglyceride plasticizer and from 0 to about 40 percent by weight of an ester plasticizer with the plasticizer being uniformly and cohesively dispersed and bound throughout the reaction product overlay.

2. The floor mat according to claim 1 wherein the reaction product overlay comprises a sheet of the reaction product overlay adapted for adhesive attachment to a supportive base.

3. The floor mat according to claim 2 wherein the reaction product overlay includes a protective cover to protect the reaction product overlay from becoming prematurely contaminated with contaminants before its use.

4. The floor mat according to claim 1 wherein the reaction product overlay comprises a coating applied to a supportive base.

5. The floor mat according to claim 2 wherein the supportive base comprises a plastic support.

6. The floor mat according to claim 5 wherein the floor mat comprises a plurality of reaction product overlays disposed in a stacked configuration and further comprising a plurality of plastic sheet supports disposed therebetween wherein the plurality of plastic sheet supports each serve as a supportive base for each reaction product overlay.

7. The floor mat according to claim 1 wherein the thermosetting reaction media contains from about 20 percent to about 48 percent by weight epoxidized soybean plasticizer.

8. The floor mat according to claim 7 wherein the isocyanate prepolymer consists essentially of a diisocyanate prepolymer and the reaction media contains from about 1 percent to about 20 percent by weight of a diester plasticizer at a weight ratio of epoxidized soybean oil plasticizer to diester plasticizer ranging from about 1:1 to about 6:1.

9. The floor mat according to claim 1 wherein the isocyanate prepolymer comprises diisocyanate prepolymer in an amount from about 4 percent to about 7 percent by weight of the thermosetting reaction media.

10. The floor mat according to claim 9 wherein the diol comprises a member selected from a group of polyoxyethylene diols and polyoxypropylene diols having a molecular weight ranging from about 2,000 to about 6,000, and further comprises a member selected from a group of polyoxyethylene triols and polyoxypropylene triols having a molecular weight ranging from about 3,000 to about 7,000.

11. The floor mat according to claim 10 wherein the weight ratio of diol to triol ranges from about 7:13 to about 13:7.

12. The floor mat according to claim 11 wherein the reaction product overlay comprises a coating disposed upon a supportive base.

13. The floor mat according to claim 9 wherein the reaction product overlay comprises a sheet having a thickness of at least about 10 mils.

14. The floor mat according to claim 11 wherein the floor mat includes bristled projections coated with the reaction product overlay.

15. The floor mat according to claim 10 wherein the reaction product overlay includes a removable protective cover to protect against premature contamination of the reaction product overlay.

16. The floor mat according to claim 12 wherein the supportive base comprises a plastic sheet.

17. The floor mat according to claim 12 wherein the reaction product overlay comprises an adhesive inlay adhesively engaged onto the supportive base.

18. The floor mat according to claim 11 wherein the floor mat consists essentially of the reaction product overlay adapted to be adhesively applied to a floor for use as the floor mat.

19. The floor mat according to claim 11 wherein the ester plasticizer comprises dibutyl sebacate.

20. A method for preparing a preformed antipathogenic, viscoelastomeric, cohesive and releasable adhesive thermoset floor mat reaction product overlay, said method comprising:
   a. providing a thermosetting reaction media comprised of a substantially uniform admixture of about 4 to about 8 percent by weight isocyanate prepolymer, from about 35 to about 55 percent by weight polyols with said polyols consisting essentially of a straight chain linking diols and cross-linking triols each having repetitive ether groups at a diol to triol weight ratio ranging from about 3:1 to about 1:3, and from about 20 to about 55 percent by weight of a plasticizer comprising less than about 50 percent by weight of an epoxidized triglyceride plasticizer and from 0 to about 40 percent by weight of an ester plasticizer;
   b. preforming the thermosetting reaction media to a preformed thermosetting form for preparing the reaction product overlay; and
   c. allowing the preformed thermosetting form to thermoset so as to provide the reaction product overlay.

21. The method according to claim 20 wherein the providing of the thermosetting reaction media includes from about 5 to about 15 percent by weight of a liquid dialkyl ester plasticizer at a weight ratio of triglyceride plasticizer to dialkyl ester plasticizer ranging from about 1:1 to about 6:1.

22. The method according to claim 21 wherein the thermosetting reaction media contains from about 10 to about 20 percent by weight polyether diol and from about 25 to about 35 percent by weight polyether triol, both of which have a molecular weight ranging from about 2,000 to about 7,000, or wherein the thermosetting reaction media has a weight ratio ranging from about 7:13 to about 13:7 of polyether diol to polyether triol, both of which have a molecular weight ranging from about 2,000 to about 7,000.

23. The method according to claim 22 wherein the reaction product overlay includes from about 4 to about 7 percent by weight of a diisocyanate prepolymer.

24. The method according to claim 23 wherein the preforming comprises preforming the thermosetting reaction media into a thermosetting sheet form which upon curing provides the reaction product overlay in a sheeted form.

25. The method according to claim 24 wherein a sheet of the reaction product overlay is adhesively applied to a floor to provide the floor mat.

26. The method according to claim 25 further comprising contaminating the reaction product overlay with foot borne contaminants to form a contaminated reaction product overlay, and restoratively decontaminating the contaminated reaction product overlay by cleansing the contaminated reaction product overlay to operationally restore effectiveness of the reaction product overlay.

27. The method according to claim 23 wherein the preforming comprises coating a supportive base with the thermosetting reaction media.

28. The method according to claim 27 comprising placing a removable protective cover upon an exposed surface of the reaction product overlay to protect the surface against premature contamination.

29. The method according to claim 21 wherein the dialkyl ester comprises dibutyl sebacate.

\* \* \* \* \*